Oct. 1, 1968     L. UNGER     3,403,414

COMPOSITE FIBER AND URETHANE FOAM PILLOW AND BEDDING STRUCTURES

Filed Nov. 17, 1966

INVENTOR.
Leo Unger
BY William B. Jaspert
Attorney.

United States Patent Office 3,403,414
Patented Oct. 1, 1968

3,403,414
COMPOSITE FIBER AND URETHANE FOAM
PILLOW AND BEDDING STRUCTURES
Leo Unger, 5948 Phillips Ave.,
Pittsburgh, Pa. 15217
Filed Nov. 17, 1966, Ser. No. 595,258
1 Claim. (Cl. 5—355)

ABSTRACT OF THE DISCLOSURE

Pillows formed of urethane foam bodies and the like have the advantage of being free of feathers and filling materials to which people may be allergic, and they are also resistant to complete crushing. However, the foam type pillow stuffers that are not too readily compressible, produce a certain degree of stiffness or resistance that causes discomfort to the user.

---

Figure 1:
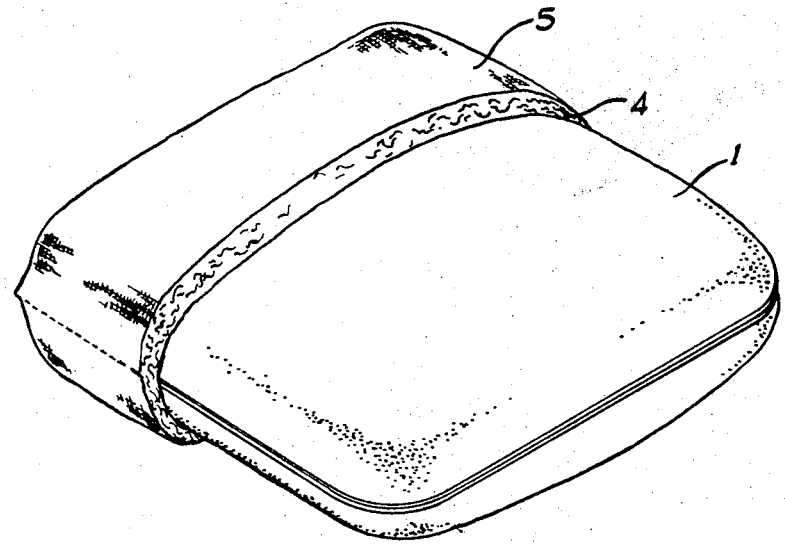

By means of the present invention, a loose, non-woven, synthetic fiber material is wrapped around a compressible foam material such as urethane foam, and stuffed in a ticking to produce a soft and yet firm pillow.

Figure 2:
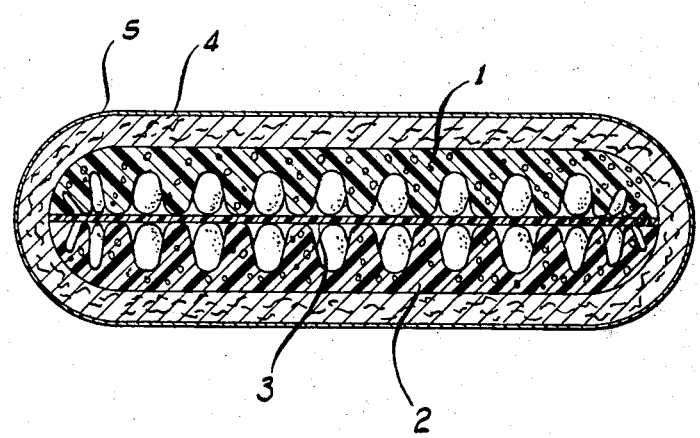

The invention will become more apparent from a consideration of the accompanying drawing constituting a part hereof in which like reference characters designate like parts and in which:

FIGURE 1 is an isometric view of a composite pillow embodying the principles of this invention; and FIGURE 2 is a cross-sectional view thereof.

In the drawing, the numerals 1 and 2 designate the urethane foam material which is cast to form pyramidal projections, as shown, with about an equal amount of space between the projections to allow flexing of the pyramidal portions. The members 1 and 2 are separated by a dividing flat section 3 so that the pyramidal projections will not interlock with one another. The relative size and proportioning of the pyramidal finger-like members and adjacent spaces controls the degree of firmness or flexibility of the pillow.

In accordance with the present invention, a down-like substance of loose fibers 4, which is commercially available in flat sheet-like foam of substantial thickness, is wrapped around the assembled urethane foam bodies 1 and 2, as shown in FIGURE 2, and the assembled composite filler is then inserted in ticking, designated by the numeral 5, FIGURE 2. The down-like material 4 may consist of Dacron fibers or any other synthetic, non-allergenic material. Also, instead of the cloth ticking, a plastic casing may be employed.

A composite pillow of the above-described construction is both firm and soft, the down-like body being supported by the structural shape of the urethane foam material, so that the pillow, as a whole, will retain its shape. The urethane foam body prevents compression to the point of colapse, while at the same time the downy fibrous material provides a softness to lend complete comfort to the user.

Although one embodiment of the invention has been herein illustrated and described, it will be evident to those skilled in the art that various modifications may be made in the details of construction without departing from the principles herein set forth. For example, the urethane material or core may be constructed as a unitary member by joining the ends of the pieces 1, 2 and 3, in the manner disclosed in my former Patent No. 3,205,515.

I claim:

1. A composite pillow construction consisting of a pair of preformed pad-shaped members of compressible foam material having juxtaposed spaced projections separated by a divider and a soft, fluffy, down material of loosely held non-woven synthetic fiber completely wrapped around said pair of pad members, said assembled pads, dividers and fluffy down material being disposed in a shaped, conforming ticking.

References Cited

UNITED STATES PATENTS

| | | | |
|---|---|---|---|
| 3,205,515 | 9/1965 | Unger | 5—345 X |
| 3,283,346 | 11/1966 | Marsh et al. | 5—355 |
| 3,287,750 | 11/1966 | Jessup | 5—355 |
| 3,323,152 | 6/1967 | Lerman | 5—345 X |
| 3,327,333 | 6/1967 | Jessup | 5—355 |

CASMIR A. NUNBERG, *Primary Examiner.*